United States Patent [19]
Kautz

[11] Patent Number: 5,516,009
[45] Date of Patent: May 14, 1996

[54] STIRRER FOR A HOPPER

[75] Inventor: Timothy J. Kautz, Osceola, Wis.

[73] Assignee: Tecnetics Industries, Inc., St. Paul, Minn.

[21] Appl. No.: 207,021

[22] Filed: Mar. 4, 1994

[51] Int. Cl.$^6$ ..................................... G01F 11/20
[52] U.S. Cl. .................. 222/238; 366/155.1; 366/329.1
[58] Field of Search .................................. 222/236, 238,
222/239; 366/154–156, 158, 194, 195,
241, 279, 342–344, 154.1, 155.1, 155.2,
196, 325.1, 325.2, 325.92, 329.1, 330.1,
330.3

[56] References Cited

U.S. PATENT DOCUMENTS

| | | | |
|---|---|---|---|
| 72,535 | 12/1867 | Payne | 366/330.3 |
| 159,087 | 1/1875 | Garner | 222/238 |
| 858,017 | 6/1907 | Pence | 366/155 |
| 1,069,083 | 7/1913 | Gibson | 222/238 |
| 1,605,502 | 11/1926 | Blue | 222/236 |
| 2,895,645 | 7/1959 | Pelak | 222/239 |
| 3,940,116 | 2/1976 | Verlinder | 366/279 |
| 4,054,272 | 10/1977 | Cooke | 366/330.1 |
| 4,083,475 | 4/1978 | Venner | 222/238 |
| 4,275,033 | 6/1981 | Schulte | 366/156 |
| 4,480,926 | 11/1984 | Lattery | 366/330.3 |
| 5,110,015 | 5/1992 | Kilts . | |

OTHER PUBLICATIONS

Informational brochure from Tecnetics, *Tecweigh Volumetric Feeders: The Inside Story*, (1992).

Primary Examiner—David Scherbel
Assistant Examiner—Terrence R. Till
Attorney, Agent, or Firm—Merchant & Gould

[57] ABSTRACT

A stirrer for stirring dry goods is provided. This stirrer has a plurality of sides for stirring a mass of normally free-flowing, dry, particulate material in a container. The stirrer includes a rotatable shaft, two sets of end blades, and two spaced-apart sets of intermediate blades affixed to the shaft. Each set of end blades is proximate to a different end of the shaft and each end blade of each such set is inclined toward the other set of end blades. The two spaced-apart sets of intermediate blades are affixed on the shaft between the sets of end blades, one set of intermediate blades on each side of a mid point of the shaft. Each set of intermediate blades includes at least one pair of blades extending outwardly in opposite direction at an oblique angle from the same general location on the shaft. The length, angle and relative locations of the blades are selected such that the blades sweep paths of travel that define a volume substantially coextensive with the portion of the shaft between the two locations where the shaft is supported. The paths of travel of different sets of intermediate blades intersect to render or maintain the mass of particulate material free-flowing when the particulate material is being withdrawn from the container.

18 Claims, 7 Drawing Sheets

STIRRER FOR A HOPPER

FIELD OF THE INVENTION

This invention relates to devices and methods for conditioning a mass of dry particulate material, such as grain and hydrated lime, in a container, such as a hopper, to maintain the mass free-flowing.

BACKGROUND OF THE INVENTION

Hoppers are used for storing free-flowing, dry, particulate materials, such as grains and hydrated lime, the hopper having an outlet in the bottom and a funnel for channeling the dry particulate material to the outlet, through which the dry particulate material can be removed or withdrawn. The particulate material, stored or loaded in the hopper, can be periodically, intermittently, or continually removed through the hopper outlet when desired. Sometimes a dry particulate material, for various reasons, agglomerates or bridges in the hopper and can not be readily removed or may not be able to be removed at all from the hopper, that is, the material, in whole or in part, does not freely flow, and the bulk density of the removed material thus is not uniform or constant. In a hopper fitted with a volumetric feeder (a device that removes or withdraws material from a storage container such as a hopper at a constant rate of volume per unit time), variabilities of bulk density of the material removed from the hopper is particularly undesireable and troublesome.

Many dry particulate materials are shipped in large bags (sometimes containing as much as five thousand pounds of material). During shipment, because of vibration, time delay, and the weight of the material in the bags, the dry particulate material tends to settle in the bags, therefore changing the bulk density. Furthermore, because of the difference in pressure by the weight of material in different locations in a bag, the bulk density varies even for the same material in different locations in the same bag. Occasionally, moisture may get into the bag, resulting in the formation of lumps or aggregates. Such lumps may further affect the consistency of the bulk density as well as hinder the flow of the material in a hopper, or a volumetric feeder connected herewith, when the hopper is being emptied.

Before the dry particulate material is sold to the consumer, such material is often transferred from the large shipment bags into smaller containers. Typically a hopper having a volumetric feeder, such as an auger connected to the outlet of the hopper, is used for transferring the dry particulate material. Because a volumetric feeder feeds a fixed volume of material per unit period of time, variations in bulk density are undesirable, as mentioned above. Further, some dry particulate materials have a tendency to bridge in the hopper of the volumetric feeder, resulting in inconsistent feed rate and sometimes cessation of transferring of the dry particulate material out of the feeder. Conventional means of preventing bridging and facilitating the transfer of material out of a feeder hopper, such as using a vibrator on the walls of the feeder hopper, sometimes are unable to prevent bridging or to maintain a consistent bulk density of the material being transferred out of the feeder hopper.

SUMMARY OF THE INVENTION

This invention, in one aspect, provides a stirrer which can be used for stirring a mass of normally free-flowing, dry, particulate material, such as grains and hydrated lime, in a hopper for agitating or stirring the mass to ensure the mass is free-flowing and for "conditioning" the mass of the dry particulate material to have a consistent or uniform bulk density. Such a stirrer-bulk density conditioner can generally be used to render a mass of dry particulate material free-flowing, for example, and for conditioning the bulk density of dry particulate materials for a volumetric feeder. The stirrer breaks, overcomes, or prevents bridging or agglomeration of the particulate material in the funnel of the hopper. The stirrer can be used for stirring dry particulate material in a hopper having a generally square or rectangular cross-section and whose funnel is defined or formed in part by two generally planar, inwardly sloped, oppositely disposed first and second walls.

The stirrer has a rotatable shaft positioned generally perpendicular to the first and second walls, hereinafter referred to as "end walls" of the hopper. Affixed on the shaft is a plurality of stirring members or blades that, when the stirrer is rotated, extend into the funnel of the hopper. The stirrer has at least two sets of "end" blades, each set being affixed to the shaft proximate a different location where the shaft is supported, each location being proximate to a different end of the shaft. Each end blade is preferably inclined toward the other end of the shaft so as to be generally parallel to the hopper end wall that is proximate to the end blade when the shaft is rotated to place the face of the end blade adjacent to the end wall. The stirrer further has at least two spaced-apart sets of "intermediate" blades affixed on the shaft between the end blades. Each set of intermediate blades has at least one pair of blades extending outwardly from the same general location on the shaft and affixed at an angle to the shaft such that the end of at least one blade in the set sweeps proximate to an adjacent hopper end wall. The blades of the stirrer sweep paths that define a volume which is essentially co-extensive with the portion of the shaft between the two locations where the shaft is supported.

A support, rig, a journal or the like can be rigidly connected to, and preferably on top of, or above, the hopper for rotatably supporting the stirrer between the hopper planar end walls so that the stirrer can rotate freely with its blades extending into the hopper. A motor or a mechanical energy supplying means can be affixed on one end of the shaft for supplying energy to rotate the stirrer on the axis of the shaft in order to stir the dry particulate material.

The blades of the stirrer interact with each other to stir, agitate, mix, or gently impact the mass of dry particulate material in the hopper to keep it loose or free-flowing and thereby condition the material such that a consistent or uniform bulk density is attained and maintained. If the hopper is provided at the bottom with a volumetric feeder, e.g., an auger conveyor, the dry particulate material having uniform bulk density is conveyed out of the hopper at a steady volumetric rate. A volumetric feeder that can be used in this manner is disclosed in U.S. Pat. No. 5,110,015 (Kilts), which description relating to how the volumetric feeder is connected to and functions with respect to the hopper is incorporated by reference herein. Thus, the operation of the stirrer conditions the mass of dry particulate material such that volumetric units of the dry material flowing out of the feeder have a consistent bulk density. Lumps or other bulky aggregation of dry material that are formed by agglomeration during the shipment of the dry particulate material in bulk form can be broken up by the stirring action of the blades. The rotation of the stirrer is preferably slow enough that there is no significant or excessive disintegration of the individual particles of the dry particulate material. Preferably, the blades of the stirrer are beveled on their edges and tips (or ends) to reduce the energy needed to drive the blades of the stirrer through the mass of the dry particulate material.

The stirrer-hopper combination or conditioner can be used, for example, with normally free-flowing, dry, particulate material such as hydrated lime, soda ash, iron oxide-manganese dioxide, mushroom bedding, and even materials that have a high tendency to bridge, such as chopped or particulate fiberglass.

DETAILED DESCRIPTION

Figure 1:
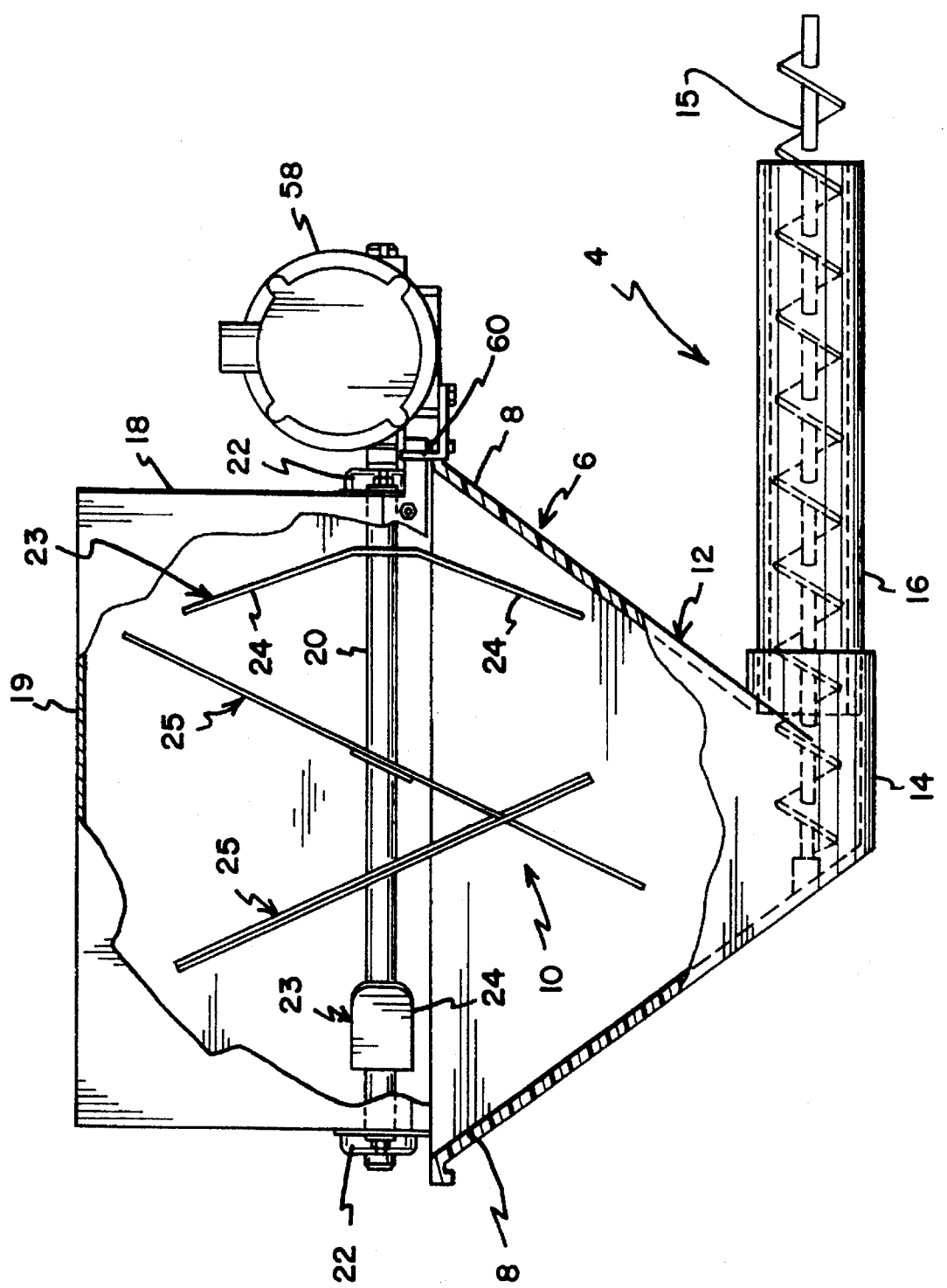
FIG. 1 is a side view in elevation and partial cross-section of an embodiment of the invention.

Referring now to the drawing, wherein like reference numerals indicate corresponding structure throughout the several figures, and referring initially to FIG. 1, an embodiment of a stirrer of the present invention is shown. The stirrer, generally designated by reference number 10, for conditioning dry particulate material is shown in association or combination with a volumetric feeder apparatus 4 having a hopper 6 with two generally-planar, oppositely-disposed, end walls 8 and two side walls (not shown in FIG. 1, but shown in FIG. 9 as 55). The shaft 20 of stirrer 10 is rotatably mounted on the hopper 6. The end walls 8 and the side walls 55 form the hopper funnel which defines a generally inverted-pyramid-shaped storage space for holding the dry material. Preferably, the side walls 55 and the end walls 8 have the same size and shape. Each of the walls include a slope or inwardly inclining portion to define the hopper funnel for guiding the dry material downwardly toward the bottom outlet of the hopper 6 which communicates with a feed auger 15. Hopper 6 further includes a bottom portion which has a cylindrical housing 14 defining a space therein for housing the adjacent portion of the feed auger 15. The cylindrical housing 14 is connected to and with a discharge pipe 16. The auger 15 is partially disposed within the housing 14 and extends through pipe 16 which is connected to cylindrical housing 14 and in communication therewith. A preferable auger 15 includes a shaft and a screw flight wherein the rotation of the auger urges the dry particulate material from the storage space in the hopper 6 through the cylindrical space defined by cylindrical housing 14 and discharge pipe 16 to a discharge location exterior to the hopper.

Figure 2:
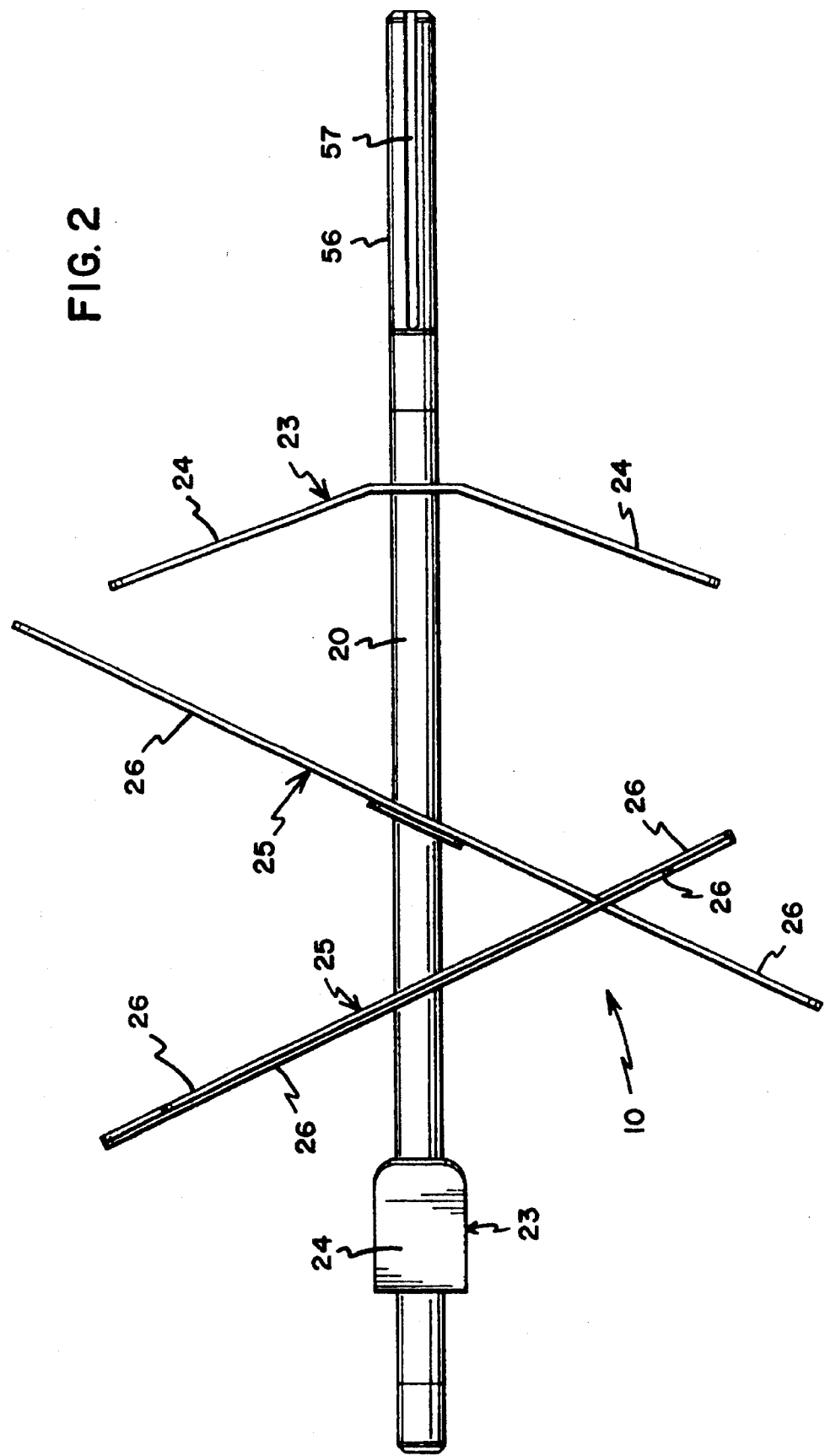
FIG. 2 is an enlarged view in elevation of the stirrer shown in FIG. 1.
Figure 3:
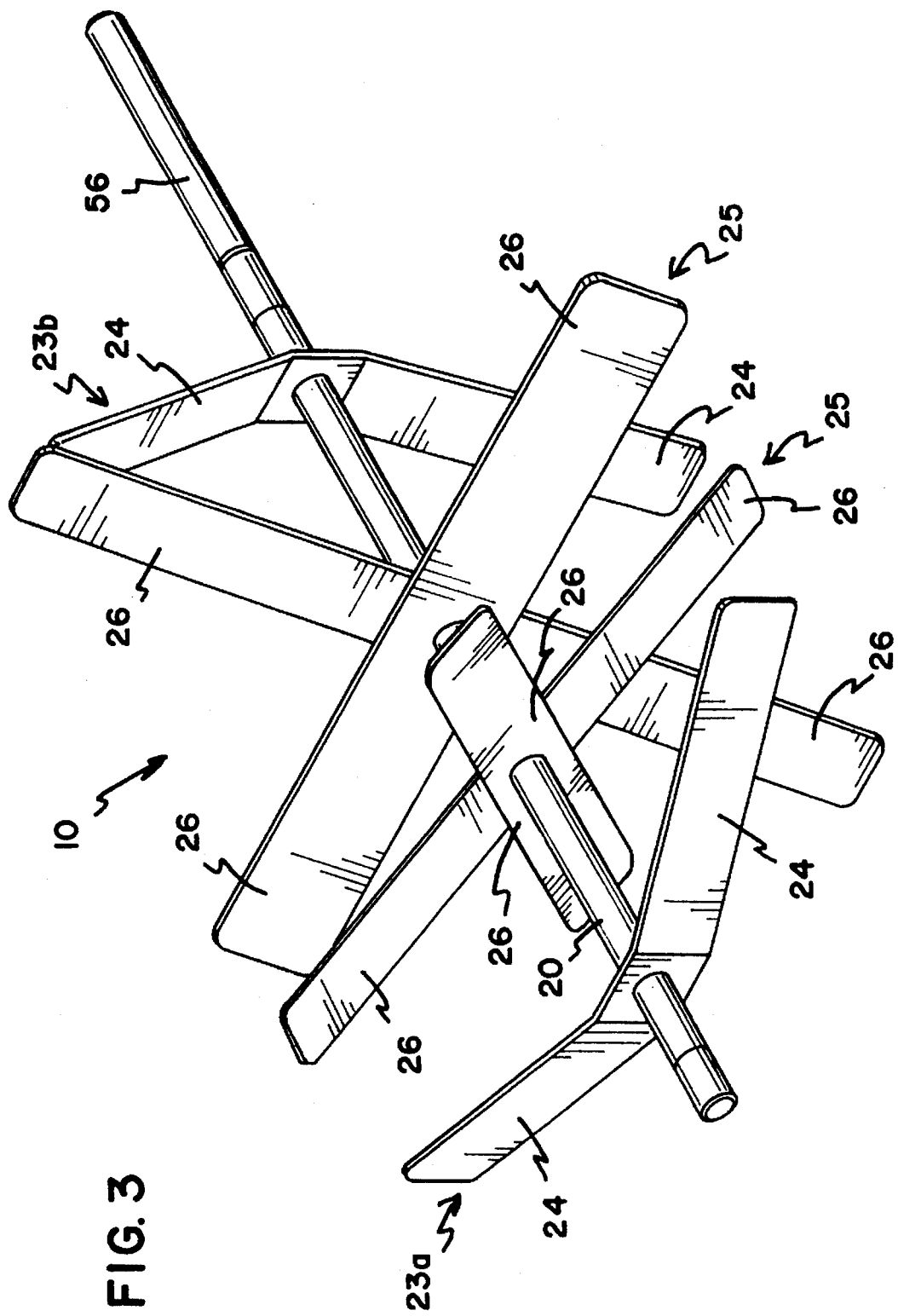
FIG. 3 is an enlarged isometric view of the stirrer shown in FIG. 2.

The hopper 6 can be surmounted by a housing 18 rigidly connected to the top of the hopper, for example, by bolted flanges. The top 19 of housing 18 can be provided with an opening (not shown) through which dry material is introduced. The stirrer 10 has a shaft 20 that is supported by means of roller bearings 22 whose housing is bolted on the housing 18 so that the shaft is rotatably supported in a position lateral or perpendicular to the end walls 8 of the hopper 6 when viewed from the top. The shaft 20 has mounted thereon a plurality of blades, which include at least one and preferably two sets 23 of end blades 24, each set being affixed to the shaft proximate a different end of the shaft and at least one and preferably two spaced-apart sets 25 of intermediate blades 26 affixed to the shaft between the sets of end blades. The sets 25 of intermediate blades are positioned such that they are evenly spaced-apart from each other and from the respective proximate set 23 of end blades. Referring to FIGS. 1–3, the stirrer 10 has two pairs of end blades 24 and two sets 25 of intermediate blades 26. Each of the end blades 24 of one set 23 of end blades inclines toward the other set 24 of end blades at an angle to the shaft 20 so that the face of each end blade 24 is generally parallel to the planar end-wall 8 that is proximate to that end blade when the shaft 20 is rotated so as to place that end blade in a position adjacent to the generally planar end wall 8.

Figure 4:
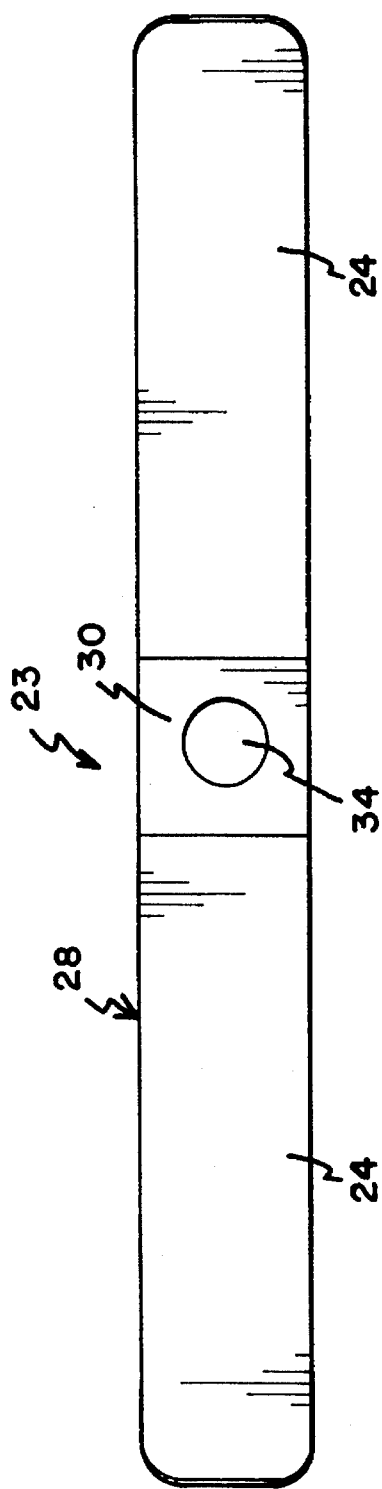
FIG. 4 is a plan view of a pair of end blades of the stirrer shown in FIG. 1.
Figure 5:
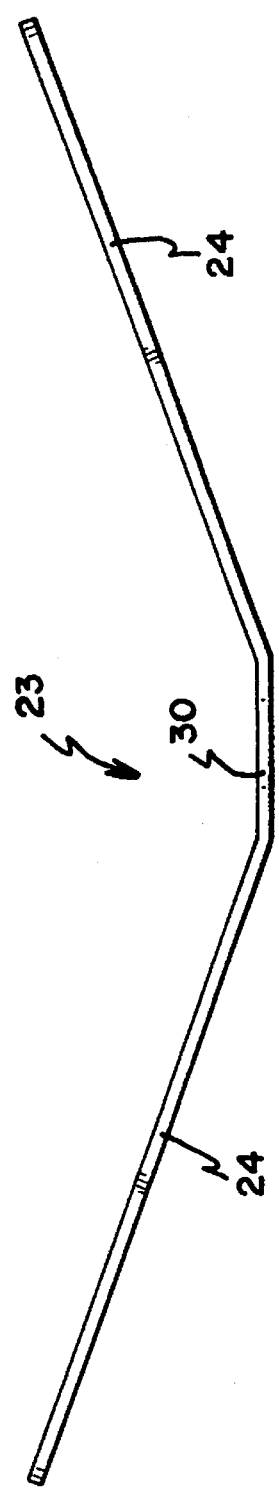
FIG. 5 is a side view of the end blades shown in FIG. 4.

Referring to FIGS. 4 and 5, the set 23 of end blades are made from a single strip 28 or generally rectangular plate, e.g., each of stainless steel, that has a central portion 30 and two end portions 24 that constitute the two end blades in the set. The two end portions 24 are bent symmetrically in relation to the central portion 30 so that each end portion 24 forms an angle that is less than 180° with the central portion 30 on the same side of the rectangular strip 28. During the fabrication of the stirrer 10, a centrally-located hole 34 is made at the mid-point of the rectangular strip 28 so that the set 23 of end blades can be affixed on to the shaft 20 by inserting the shaft 20 through the centrally-located hole 34 and subsequently affixing, preferably by welding, the set 23 of end blades onto the shaft. In this way, each of the end blades 24 in a set 23 extend outwardly from the shaft 20 and toward the other set 23 of end blades.

Figure 6:
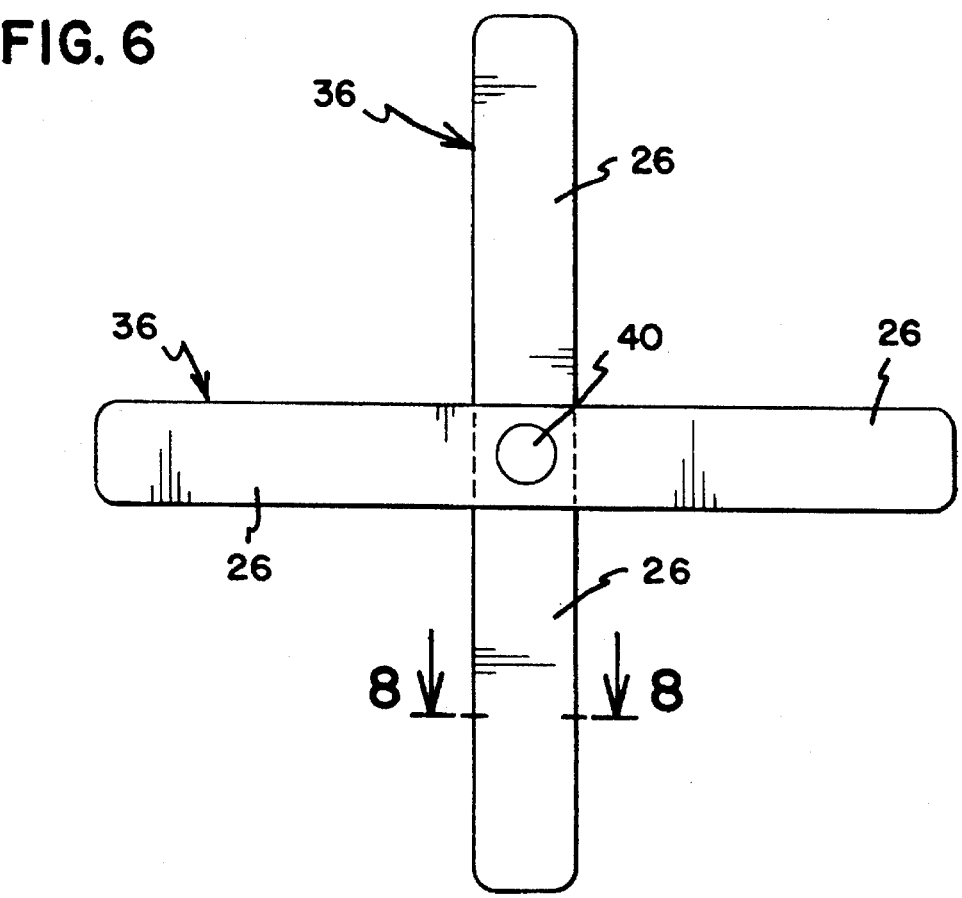
FIG. 6 is a plan view depicting a set of intermediate blades shown in FIG. 1.
Figure 7:
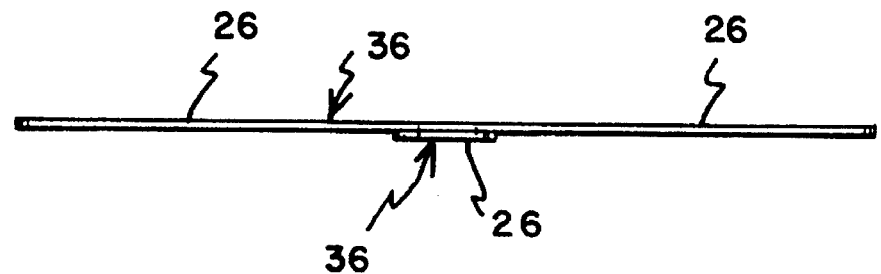
FIG. 7 is a side view of the set of intermediate blades shown in FIG. 6.

Referring to FIG. 3, the stirrer 10 includes two sets 25 of intermediate blades, each set consisting of two pairs of blades, each such pair having two oppositely disposed blades 26. As shown in FIGS. 6 and 7, there are two pairs of blades 26 in each set 25 of intermediate blades, each pair constructed from a strip 36 or generally rectangular plate, preferably of stainless steel 36. The strips 36 are arranged so that a planar face of one contacts a planar face of the other to form a "Greek cross", i.e., a cross in which all of the branches have the same size and the same rectangular shape. FIG. 7 shows the side view of this arrangement. A centrally-located hole 40 (FIG. 6) is formed at the mid-point of each rectangular strip 36 so that the strips 36 can be positioned onto the shaft 20 by inserting the shaft through the centrally-located hole 40 and affixing the set 25 of blades at selected positions on the shaft. The centrally-located hole 40 on each rectangular strip 36 is formed to have a slightly larger diameter than the diameter of the shaft 20 so that the rectangular plate 36 and therefore the intermediate blades 26 can be inclined at an oblique or non-perpendicular angle to the shaft. In this way, the blades 26 of each pair extend outwardly in opposite direction from the same general location on the shaft 20. Alternatively, the blades 26 can be affixed on the shaft by welding or other equivalent means, such as forming flanges on the blades and bolting the flanges onto the shaft 20 to secure the blades.

Referring to FIGS. 1–3, each set 25 of intermediate blades are positioned on the shaft at an acute angle, e.g. of about 60°, to the shaft. Each set 25 of intermediate blades is positioned on the shaft 20 between the two sets 23a, 23b (in FIG. 3) of end blades on the shaft, e.g., about one-third of the way from the closest set of end blades. Furthermore, the two sets 25 of intermediate blades are positioned so that each one of such set is located on a different side of the mid-point of the shaft 20. In each pair of blades 26 in the intermediate set 25, one such blade inclines outwardly toward the nearest end of the shaft or the adjacent hopper end wall 8 and the other such blade inclines inwardly (i.e. away from the nearest end of the shaft) toward the other (remote) end of the shaft or the intermediate set 25 proximate to the mid-point of the shaft 20. In this manner, the two sets 25 of intermediate blades have inwardly inclining blades that the paths of travel of such blades intersect or cross over as the stirrer rotates to prevent bridging of the dry particulate material in the hopper and to break up large lumps or agglomerations. The lengths of the intermediate blades 26 are selected so that as the stirrer 10 turns on the axis of the shaft 20, an outer end or tip of each pair of intermediate blades 26 sweeps proximate to an adjacent hopper end wall 8.

The angle of incline of the intermediate blades in relation to the shaft, the spacing position of the intermediate blades on the shaft relative to the other blades, and the length of any of the blades can be varied depending on the dimensions and shape of the hopper, and that the dimensions of all blades, their angles with respect to the shaft and one another, and their spacing can be such that rotation of the stirrer will render or ensure that the mass of particulate material in which the blades of the stirrer operate is free-flowing. For example, if the slope of the sloped end walls 8 of the hopper 6 is steep, it may be preferable to incline the intermediate blades 26 at an acute angle greater than 60° from the axis of the shaft 20. The preferred acute angle of incline of the intermediate blades 26 to the shaft 20 is about 45° to about 75°, more preferably about 55° to 70°, most preferably about 60°. Generally, the hopper 6 will have end walls 8 with a slope of about 40° to 60°. For such hopper, it is preferable to incline the intermediate blades 26 at an angle of about 60°. The two blades 26 in a pair or a set 25 of intermediate blades can also be of different length so that their ends can be proximate to the side walls 8.

Figure 10:
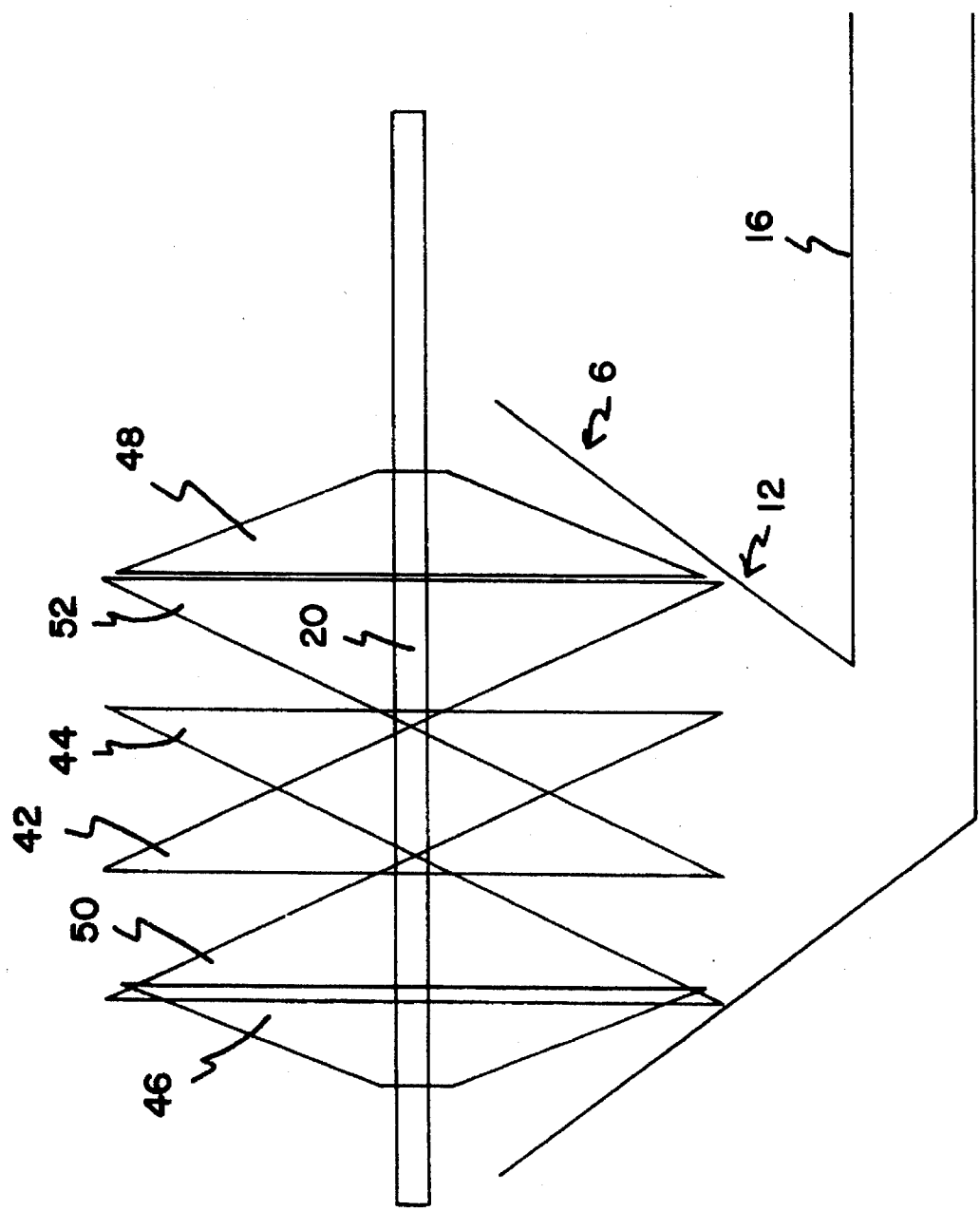
FIG. 10 is a schematic side-view of the volumes defined by the paths of blades of the stirrer shown in FIG. 1 when the stirrer is rotated in operation.

Generally, the intermediate blades 26 are positioned on the shaft 20 so that when the stirrer 10 rotates, one end or tip of the intermediate blade 26 sweeps very close to the adjacent planar hopper end wall 8 without, of course, touching the end wall. This arrangement prevents undesired or excessive build-up of the dry particulate material on the hopper end wall 8. If preferred, the blades 26 can be fitted with rubber or other soft tips which touch the hopper walls to reduce bridging or build-up of dry particulate material. In FIGS. 1–3, the two pairs of intermediate blades 26 in each set 25 are arranged so that as stirrer 10 rotates, the two pairs of blades sweep through generally the same path of travel. Furthermore, the paths of the two sets 25 of intermediate blades intersect as the stirrer 10 rotates. Viewing from the side, the paths of blades from sets 23 of end blades and sets 25 of intermediate blades cross over (i.e., intersect) or are proximate to one another so that they cover a large volume in the hopper between the two sets 23 of end blades. This interaction of blades from different sets, whereby the dry material is stirred or swept by blades at different angles, facilitates the prevention of bridging. FIG. 10 depicts the volumes defined by the sweeping paths of travel of the blades in relation to the hopper 6 upon the rotation of the stirrer 10 as viewed from the side of the stirrer 10. The volume defined by the path of travel each blade resembles a generally conical shape. As can been seen in FIG. 10, the cones 42, 44 defined by the sweeping paths of the inwardly-inclining intermediate blades of different sets 25 of intermediate blades cross over or intersect. Furthermore, the cones 46, 48 defined by the sweeping paths of the sets 23 of end blades are proximate to or intersect the cones 50, 52 defined by the sweeping paths of the outwardly-inclining intermediate blades such that the volume defined by the cones is substantially coextensive with the distance between the sets 23 of end blades.

Figure 8:
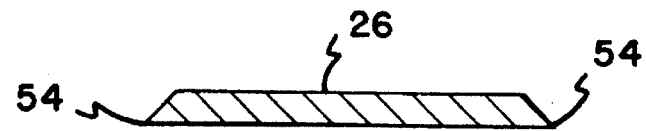
FIG. 8 is a cross-sectional view of one of the blades of FIG. 6 taken along the plane 8—8.

Referring now to FIGS. 4–7, each of the strips 28 and 36 has a width that is slightly larger than the diameter of the shaft 20 so that after a hole has been made in the mid-point of the strip, the strip (and its blades) still has adequate mechanical integrity to be mounted and affixed on the shaft. The edges of blades 24 and 26 can be bevelled as shown in FIG. 8 to provide edges 54 for reducing resistance while the blades are passing through the mass of dry particulate material as the stirrer 20 is rotated. Such edges 54 facilitate movement of the blades 24, 26 through the mass of dry particulate material and reduces the energy needed to turn the stirrer 20. The end (or the outwardly-extending tip) of a blade 24, 26 can be rounded by removing the sharp corners to allow smooth movement of the blade in the mass of dry material in close proximity to a hopper wall and to reduce risk of injuring negligent operators. Furthermore, although it is preferable that the blades be bevelled, in applications where the dry particulate materials are preferably not to be damaged at all by being cut by edges, a more rounded edge can be provided on the blades without adversely affecting the functioning of the stirrer.

Figure 9:
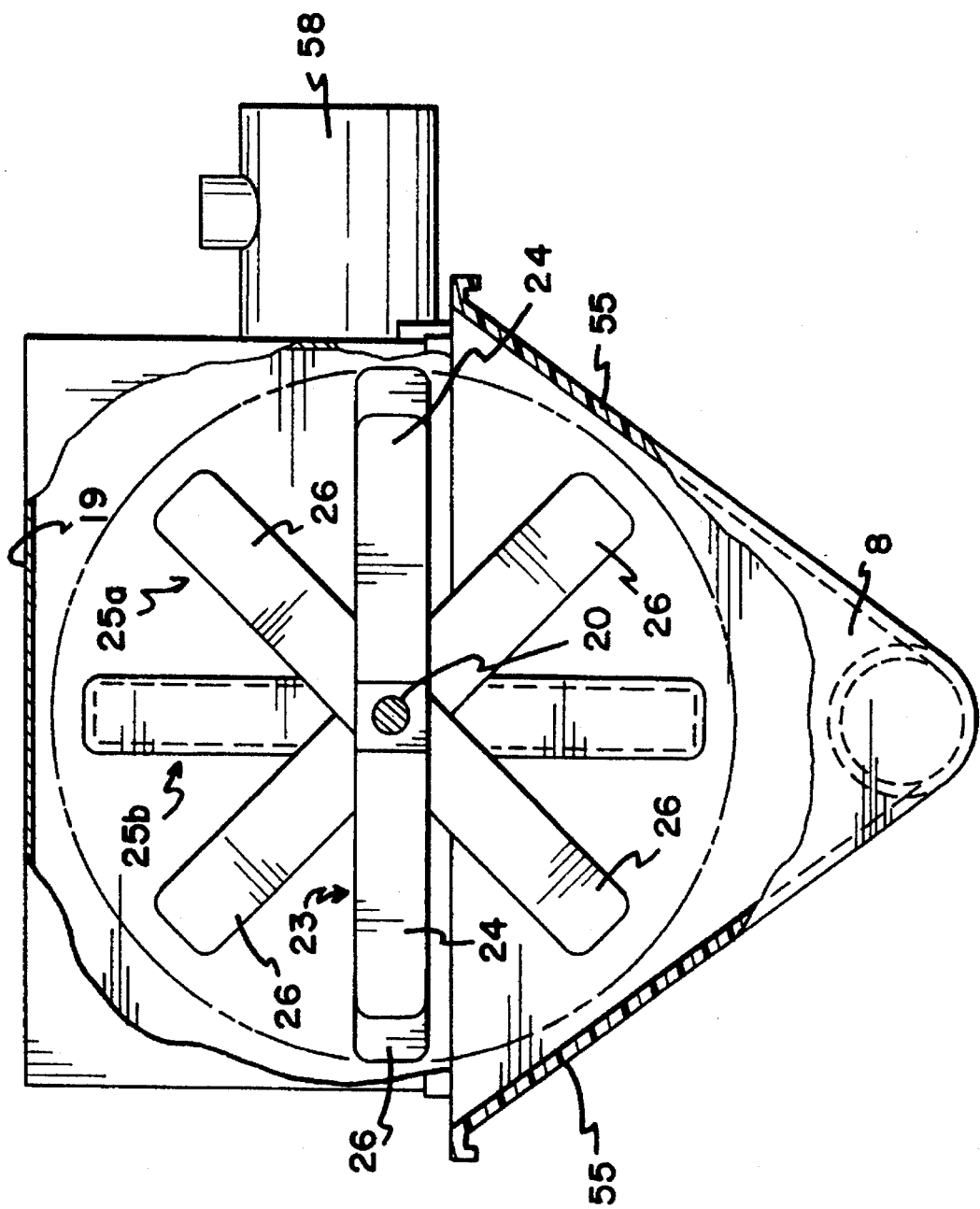
FIG. 9 is an end view in partial cross-section of the embodiment of FIG. 1.

The blades of the stirrer 10 can be circumferentially staggered. In the embodiment shown in FIG. 9, except for the set of end blades (shown by broken lines) proximate to the motor 58, which end blades are radially parallel to a pair of blades 26 in the proximate set of intermediate blades, the blades in the stirrer are circumferentially staggered. As used herein, the blades are "circumferentially staggered" if viewing from the end of the shaft, the blades extend radially outward from the shaft such that blades from adjacent sets form oblique angles and no two blades in adjacent sets are parallel to each other. Two blades are "radially parallel" if, viewing from the end of the shaft, the two blades are parallel to each other. In FIG. 9, the end blades 24 in one set 23 are perpendicular to the end blades 24 in the other set. One set 25 of intermediate blades is arranged so that the blades 26 in the set form 45° angles with the blades 24 of an adjacent set 23 of end blades. The two sets 25a, 25b (in FIG. 9) of intermediate blades are positioned so that the blades of one set form 45° angles with the blades of the other set. As a result, viewing from one end of the shaft, each end blade 24 is radially parallel or overlaps one of the intermediate blades 26 and is perpendicular to another intermediate blade 26.

In another embodiment, all of the blades (including the end blades) are offset from blades of adjacent sets such that viewing from the end into the shaft, each blade forms a 45° angle with a blade in an adjacent set. In this way, with two sets of end blades and two sets of intermediate blades, although the blades in one set of end blades are not perpendicular to the blades in the other set of end blades as shown in FIG. 9, the blades in adjacent sets are not radially parallel. As a result, the limiting factor on the length of an end blade is not the proximity of the end of the end blade 24 and the ends of the adjacent intermediate blades 26. Thus each end blade 24 can be of such length that its end sweeps proximate to the side walls 55 or the auger 15 and yet none of the end blades 24 has an end that touches another blade.

Even though the aforementioned arrangements of blade positions provides weight balance to the stirrer, the arrangement can be modified so that the blades do not form 45° angles with other blades and still are effective in conditioning the dry particulate material to obtain uniform bulk density and prevent bridging. For example, one or more of the intermediate blades can be offset at an acute angle different from 45° so long as the ends of the blades do not touch another blade, thus permitting maximum lengths of blades to be used. Preferably, the blade can sweep proximate to a hopper wall without touching it.

As used herein, when referring to the distance by which a blade sweeps past a wall, the term "proximate to" means "close to." This distance can typically be about 0.25 cm (0.1 inch) to about 15 cm (6 inches), preferably about 0.5 cm (0.2 inch) to about 7.5 cm (3 inches), and more preferably about 0.65 cm (0.25 inch) to 5 cm (2 inches). This distance can vary with the size of the stirrer. For a large stirrer, for example, one that have, on the widest part of the hopper, sides longer than 120 cm (48 inches), because of the difficulty of machining structures with close tolerances, this distance may have to be somewhat larger.

Although the stirrer is well suited for use in feed hopper having generally planar end walls that slope to funnel the free-flowing dry material into a feeder mechanism such as an auger, the stirrer may be adapted for use with a hopper with curved wall(s). Both the end walls and the side walls may be either planar or curved. In another embodiment, at least part of the side walls may be curved so as to conform more closely to the sweeping path of the blades of the stirrer.

Referring again to FIGS. 1 and 2, the ends of the shaft 20 extend through the walls of the housing 18 and can be rotatably supported by roller bearings 22 which are affixed on the shaft 20. A portion 56 of the shaft 20 at one end can extend into a space outside the side wall of housing 18 and have grooves 57 formed thereon for engagement with a drive shaft (not shown). A motor 58 can be connected to the drive shaft for engaging it to rotate the stirrer 10. A torque arm 60 rigidly connected to the side wall of housing 18 and the body of the motor 58 can be used for maintaining the position of the motor on the side wall.

An example of the operation of the stirrer 10 is the conditioning of the bulk density of a mass of chopped fiberglass, such as recycled fiberglass, in the hopper with a volumetric feeder. An embodiment of a stirrer as shown in FIG. 1 was used for stirring the mass of chopped fiberglass to maintain the mass of fiberglass free-flowing and effect a desired bulk density as the fiberglass was withdrawn from the hopper by the feeder. The widest part of the hopper 6 had a square cross section with 58 cm (23 inches) long sides. Therefore, the portion of the shaft 20 between the two points where it was supported by means of roller bearings 22 on the side wall of housing 18 was about 58 cm (23 inches) long. The end blades 24 were affixed to be about 5 cm (2 inches) from the inner surface of the side wall of the housing 18 supporting the shaft 20. The sloped end walls 8 and side walls (not shown) of the hopper 6 formed angles of about 45° with a horizontal plane. The side walls were similar to the end wall in size and shape. The intermediate blades 26 were arranged to form angles of about 60° with the shaft 20 and positioned about one-third of the way on the portion of the shaft 20 between the sets of end blades. The lengths of the intermediate blades 26 were selected such that when the stirrer 10 was rotated to place the intermediate blade 26 in a position closest to an adjacent hopper end wall 8 that in part defined the funnel 12 of the hopper 6, the end of the blade 26 was about 0.64 cm (0.25 inch) from the end wall 8. The end blades 24 were inclined at an angle inwardly towards the intermediate blades 26 so that each end blade had a face that was substantially parallel to an adjacent hopper end wall wherein the end of the end blade 24 was about 1.25 cm (0.5 inch) from the end wall 8 when the stirrer 6 was rotated to place the end blade 24 in a position adjacent or close to the adjacent end wall (i.e., the end wall proximate to the blade). The lengths of the end blades 24 were selected so that the end blades 24 were long enough to be proximate or close to but not touching an auger of the volumetric feeder at the bottom of the hopper or the side walls. In this embodiment, the total length of a pair of end blades made from a single rectangular strip was 18 inches.

Chopped, recycled fiberglass was loaded or put or fed into the hopper 6 with the volumetric feeder through an opening at the top 19 of the housing 18. Subsequently, the stirrer 10 and the auger 15 of the volumetric feeder were turned on. The stirrer 10 was rotated at a rate of about 10 RPM, and the rate of rotation of the auger 15 of the volumetric feeder was adjusted so that about 1.7 m$^3$ (60 cubic feet) per hour of chopped fiberglass was conveyed out of the hopper by means of the auger 15. The chopped, recycled fiberglass that was loaded into the hopper contained matted, thin slices and had a bulk density that varied from about 288 kg/m$^3$ (18 pounds per cubic foot) to about 480 kg/m$^3$ (30 pounds per cubic foot). The chopped, recycled fiberglass exiting the volumetric feeder generally maintained the apparent physical dimensions (i.e., thin slices of about 1–3 cm$^2$ in area and 1–5 mm in thickness) of the material that was loaded into the hopper of the volumetric feeder, but had a more consistent bulk density, i.e., about 272 kg/m$^3$ (17 pounds per cubic foot) to about 320 kg/m$^3$ (20 pounds per cubic foot). Thus, the stirrer conditioned the bulk density of the chopped fiberglass such that while the starting material had a variation of bulk density of at least 40%, the particulate material exiting the volumetric feeder had a variation of bulk density of not more than 17%. It is believed that the feeder auger did not significant affect the bulk density of the dry particulate material. The chopped fiberglass was transferred out of the hopper steadily for 2 hours without interruption by bridging. It is believed that chopped fiberglass tends to pack and vary in bulk density during transportation in bulk form and is more likely to bridge in the hopper during transfer using a volumetric feeder than materials such as grains and hydrated lime and therefore the stirrer and volumetric feeder will work equally well with other particulate materials.

It is to be understood that even though numerous characteristics and advantages of the present invention have been set forth in the foregoing description, together with details of the structure and function of the invention, the specific details are illustrative only, and changes may be made in detail, especially in manners of shape, size and arrangement of parts, without departing from the spirit and scope of the invention. For example, the shaft may be supported by bearings in journal boxes bolted on the housing or simply on posts affixed to the sloped hopper end walls. The stirrer can be constructed of various materials such as stainless steel, carbon steel, or other alloys of effective strength and corrosion resistance for working with a particular dry material. There can also be more than two sets of intermediate blades and the number of blades in a set can vary. The blades in a set of blades are preferably, but not necessarily, evenly-spaced circumferentially. For example, the tip of a blade in a set of intermediate blades can be closer to the tip of one adjacent blade than to that of another adjacent blade. The stirrer can be used in a hopper without an auger. The dry particulate material can be stirred in the hopper for a period of time and then removed from the hopper by opening a door on the bottom of the hopper to discharge the dry particulate material. The amount of dry particulate material in the hopper can be varied for the successful operation of the stirrer in preventing bridging and conditioning the bulk density as long as a significant portion of the funnel of the hopper is occupied so that the blades can reach the dry material.

What is claimed is:

1. A stirrer for stirring a mass of normally free-flowing, dry, particulate material in a container comprising:

a rotatable shaft having a first end opposite a second end and further having a midpoint between the first and second ends;

a first and second set of beveled end blades affixed to the shaft, the first set of end blades positioned proximate the first end of the shaft, the second set of end blades positioned proximate the second end of the shaft, and the first and second sets of end blades being inclined towards each other; and a first and second set of beveled intermediate blades positioned between said first and second sets of end blades, the first set of intermediate blades affixed to the shaft between the first set of end blades and the midpoint of the shaft, the second set of intermediate blades affixed to the shaft between the second set of end blades and the midpoint of the shaft, and the first and second sets of intermediate blades forming oblique angles with respect to the shaft;

wherein, when the shaft is rotated, the first and second sets of end blades and the first and second sets of intermediate blades have paths of travel that define a first volume substantially co-extensive with a second volume located between the first and second ends of the shaft, and the paths of travel of the first and second sets of intermediate blades intersect to render the mass of particulate material free-flowing when the particulate material is being withdrawn from the container.

2. A stirrer for stirring a mass of dry particulate material in a hopper, the hopper having first and second oppositely-disposed end walls defining in part a funnel of the hopper, the stirrer comprising:

a rotatable shaft having a first end adjacent the first end wall and a second end adjacent the second end wall, the shaft being laterally disposed and rotatably supported above the funnel;

a first and second set of end blades affixed to the shaft, each set of end blades including two oppositely disposed and generally symmetrical end blades, the first set of end blades positioned proximate the first end of the shaft, the second set of end blades positioned proximate the second end of the shaft, and the first and second sets of end blades being generally inclined relative to the shaft such that when the shaft is rotated, the first set of end blades has a path of travel adjacent and generally parallel to the first end wall of the hopper and the second set of end blades has a path of travel adjacent and generally parallel to the second end wall of the hopper;

a first and second set of intermediate blades affixed to said shaft between the first and second sets of end blades, each set of intermediate blades including 4 intermediate blades forming a cross and aligned to form substantially 60° angles with respect to the shaft, the first set of intermediate blades having ends that sweep proximate the second end wall of the hopper, the second set of intermediate blades having ends that sweep proximate the first end wall of the hopper, and the first and second sets of intermediate blades forming oblique angles with respect to the shaft;

wherein, when the shaft is rotated, the first and second sets of end blades and the first and second sets of intermediate blades have paths of travel that define a first volume substantially co-extensive with a second volume located between the first and second ends of the shaft, and the paths of travel of the first and second sets of intermediate blades intersect to render the mass of particulate material free-flowing when the particulate material is being withdrawn from the container.

3. The stirrer of claim 2, further comprising:

a support rigidly connected to the hopper for rotatably supporting the stirrer between the end walls; and a motor connected to the second end of said shaft for supplying energy to turn said stirrer on an axis of the shaft.

4. The stirrer of claim 2, wherein the hopper has oppositely disposed side walls, and the end blades and the intermediate blades have ends that sweep proximate to the side walls.

5. The stirrer of claim 2, wherein the hopper has oppositely disposed side walls, and the end blades and the intermediate blades have ends that sweep proximate to but without touching the side walls.

6. The stirrer of claim 2, wherein the first and second sets of intermediate blades are of the same length and width.

7. The stirrer of claim 2, wherein the first and second sets of end blades are offset 90° with respect to each other, the first and second sets of intermediate blades are offset 45° with respect to each other, and the second set of intermediate blades is offset 45° with respect to the second set of end blades.

8. The stirrer of claim 2, wherein the first and second sets of intermediate blades are positioned about ⅓ along the length of the shaft between the first and second ends of the shaft.

9. The stirrer of claim 2, wherein at least one of the end blades and the intermediate blades is beveled.

10. The stirrer of claim 2 further comprising a means for transmitting mechanical energy to said shaft.

11. The stirrer of claim 2 wherein the shaft is to be rotated at a rate of from 5 RPM to 30 RPM when in operation.

12. The stirrer of claim 2 wherein the stirrer is constructed of stainless steel.

13. The stirrer of claim 2 wherein the stirrer is effective for rendering an uniform bulk density of a mass of dry particulate material in the hopper.

14. A stirrer for conditioning the bulk density of a mass of dry particulate material in a feeder apparatus having a hopper with two planar, oppositely-disposed end walls defining in part the funnel of the hopper, comprising:

a rotatable shaft adapted to be laterally disposed and rotatably supported above the funnel, the shaft having first and second ends;

two sets of end blades affixed to said shaft, each such set being proximate to a different end of the shaft, each end blade being inclined so as to be generally parallel to an adjacent hopper end wall when the shaft is rotated to place the end blade proximate to the adjacent end wall; and two evenly spaced-apart sets of intermediate blades affixed to said shaft between said sets of end blades, each set of intermediate blades forming a cross and including two pairs of oppositely disposed intermediate blades of equal length forming angles of substantially 60° with respect to the shaft, and at least one intermediate blade in each set of intermediate blades having an end that sweeps proximate to an adjacent hopper end wall;

wherein the end blades and intermediate blades sweep paths of travel defining a first volume that is substantially coextensive with a second volume located between the first and second ends of the shaft, each blade in the stirrer being beveled and sweeping proximate to a hopper wall, the blades arranged so that viewing from one end of the shaft into the shaft, the set of end blades are 90° offset to each other, the sets of intermediate blades are 45° offset to each other, and a set of end blades is 45° offset to an adjacent set of intermediate blades, and the paths of travel of different sets of intermediate blades intersect to render the mass of particulate material free-flowing and have uniform bulk density when the particulate material is being withdrawn from the hopper.

15. A dry particulate material feeding apparatus comprising:

a hopper having walls including two planar, oppositely disposed end walls defining in part a funnel of the hopper, the hopper defining a first volume;

an auger housing positioned below the hopper for receiving dry particulate material from the hopper, the auger housing including an inlet end and a discharge end;

a rotatable shaft laterally disposed and rotatably supported above the funnel and generally perpendicular to the hopper end walls;

two sets of end blades affixed to said shaft, each set being proximate to a different end of the shaft, each end blade being inclined so as to be generally parallel to an adjacent hopper end wall when the shaft is rotated to place the end blade proximate to the adjacent end wall;

two evenly-spaced sets of intermediate blades affixed to said shaft between said sets of end blades, each set of intermediate blades comprising at least one pair of blades forming an oblique angle with respect to the shaft, and at least one intermediate blade having an end that sweeps proximate to an adjacent hopper end wall;

a support positioned on and rigidly connected to the hopper above the funnel for rotatably supporting the stirrer;

a motor connected to one end of said shaft for supplying mechanical energy to turn said stirrer on an axis of the shaft; and an auger member rotatably disposed in the auger housing for urging the dry particulate material from the inlet end of the auger housing toward the discharge end of the auger housing; wherein the intermediate blades and end blades together sweep paths of travel that define a second volume that is substantially coextensive with the first volume defined by the hopper, and the paths of travel of different sets of intermediate blades intersect to render the mass of particulate material free-flowing when the dry material is being withdrawn from the hopper.

16. A stirrer for stirring a mass of normally free-flowing, dry, particulate material comprising:

an open ended container through which the particulate material flows, the container having a portion defining a first volume;

a rotatable shaft mounted in the container;

a first and second set of end blades driven by the shaft; and a first and second set of intermediate blades driven by the shaft and positioned between the first and second sets of end blades, the first and second sets of intermediate blades forming oblique angles with respect to the shaft and defining paths of travel which intersect to agitate the mass of particulate material into a free-flowing state as the particulate material flows through the container;

wherein, at least one of the end blades and intermediate blades is beveled, and the end blades and intermediate blades together sweep paths of travel defining a second volume substantially coextensive with the first volume defined by the container.

17. The stirrer of claim 16, wherein the first and second sets of intermediate blades each form a cross.

18. The stirrer of claim 16, wherein the first and second sets of end blades have end portions arranged at oblique angles relative to the shaft such that the end portions of the first set of end blades and the end portions of the second set of end blades are inclined towards each other.

* * * * *